United States Patent
Nakano et al.

(10) Patent No.: US 11,420,476 B2
(45) Date of Patent: Aug. 23, 2022

(54) TIRE

(71) Applicant: Sumitomo Rubber Industries, Ltd., Kobe (JP)

(72) Inventors: Kosuke Nakano, Kobe (JP); Masayuki Fujita, Kobe (JP); Daisuke Aoki, Kobe (JP); Daiki Imai, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 272 days.

(21) Appl. No.: 16/838,494

(22) Filed: Apr. 2, 2020

(65) Prior Publication Data
US 2020/0317002 A1 Oct. 8, 2020

(30) Foreign Application Priority Data

Apr. 3, 2019 (JP) .............................. JP2019-071436
Apr. 3, 2019 (JP) .............................. JP2019-071437
Apr. 3, 2019 (JP) .............................. JP2019-071441

(51) Int. Cl.
*B60C 11/12* (2006.01)
*B60C 11/03* (2006.01)
*B60C 11/01* (2006.01)

(52) U.S. Cl.
CPC .......... *B60C 11/0306* (2013.01); *B60C 11/01* (2013.01); *B60C 2011/0353* (2013.01)

(58) Field of Classification Search
CPC ................ B60C 11/0304; B60C 11/03; B60C 2011/0348
See application file for complete search history.

(56) References Cited

U.S. PATENT DOCUMENTS

| 6,050,313 A * | 4/2000 | Tsuda ..................... B60C 11/13 152/DIG. 3 |
| 6,796,350 B1 | 9/2004 | Gerresheim et al. |
| 2010/0200134 A1 | 8/2010 | Murata |

(Continued)

FOREIGN PATENT DOCUMENTS

| EP | 2 907 677 A2 | 8/2015 |
| EP | 3 081 392 A1 | 10/2016 |

(Continued)

OTHER PUBLICATIONS

Sumitomo Tires—Evolutionary Design. Revolutionary Performance. 2015 Consumer Tire Catalog. (Year: 2015).*

(Continued)

*Primary Examiner* — Cedrick S Williams
(74) *Attorney, Agent, or Firm* — Birch, Stewart, Kolasch & Birch, LLP

(57) ABSTRACT

The tire whose mounting position relative to a vehicle is specified, comprises a tread portion having a first tread edge and a second tread edge, and provided with three main grooves and four land portions. The main grooves include a first shoulder main groove, a second shoulder main groove, and a crown main groove. The land portions include a first middle land portion and a second middle land portion. The first middle land portion is disposed on the tire equator. The first middle land portion is provided with first transverse narrow grooves. The first transverse narrow groove comprises a first deep portion, a second deep portion and a first shallow portion therebetween to improve steering stability and ride comfort.

20 Claims, 12 Drawing Sheets

(56) References Cited

U.S. PATENT DOCUMENTS

2013/0292018 A1    11/2013  Murata
2013/0312886 A1 *  11/2013  Ohno ........................ B60C 5/00
                                                        152/526
2018/0009269 A1 *   1/2018  Kawagoe ............ B60C 11/1236
2018/0072105 A1 *   3/2018  Wakasugi ........... B60C 11/1236

FOREIGN PATENT DOCUMENTS

JP          2009-40156 A        2/2009
JP         2018008558 A  *      1/2018  ......... B60C 11/0304
WO    WO 2015/008137 A1         1/2015

OTHER PUBLICATIONS

Extended European Search Report dated Jul. 7, 2020, for European Application No. 20165365.6.

* cited by examiner

TIRE

TECHNICAL FIELD

The present invention relates to a tire, more particularly to a tire of which tread portion is axially divided into four land portions by three circumferential main grooves.

BACKGROUND ART

Patent document 1 below discloses a tire of which tread portion is axially divided into four land portions by three circumferential main grooves, and each land portion is formed as a rib extending continuously in the tire circumferential direction.

Patent document 1: Japanese Patent Application Publication No. 2009-040156

SUMMARY OF THE INVENTION

Problems to be Solved by the Invention

Generally, when land portions of a tread portion of a pneumatic tire have high rigidity, there is a tendency that steering stability is improved while ride comfort is deteriorated. In particular, when the tread portion is formed by four land portions as in the tire of Patent document 1, the above tendency tends to appear remarkably because the width of each land portion in the tire axial direction is large and the rigidity in the widthwise direction is high.

In view of the above-described problems, the present invention was made, and a primary objective of the present invention is to proved a tire of which tread portion is axially divided into four land portions and which can exert excellent steering stability and ride comfort.

According to the present invention, a tire comprises a tread portion having a first tread edge and a second tread edge to be located outward and inward, respectively, of a vehicle when the tire is mounted on the vehicle, and the tread portion provided with three main grooves extending continuously in the tire circumferential direction to axially divide the tread portion into four land portions, wherein the three main grooves are a first shoulder main groove disposed between the tire equator and the first tread edge, a second shoulder main groove disposed between the tire equator and the second tread edge, and a crown main groove disposed therebetween, and the four land portions include a first middle land portion between the first shoulder main groove and the crown main groove, and a second middle land portion between the second shoulder main groove and the crown main groove, wherein the first middle land portion is disposed so that the tire equator is positioned in the ground contact surface of the first middle land portion, the first middle land portion is provided with a plurality of transverse narrow grooves crossing the first middle land portion, the transverse narrow grooves include first transverse narrow grooves, and the first transverse narrow grooves each comprise a first deep portion, a second deep portion, and a first shallow portion therebetween whose depth is smaller than the first deep portion and the second deep portion.

It is preferable that the transverse narrow grooves include second transverse narrow grooves, and the second transverse narrow grooves each comprises a third deep portion disposed so as to include, within its length, a center in the tire axial direction of the second transverse narrow groove, a second shallow portion whose depth is smaller than the third deep portion and which is disposed on the first tread edge side of the third deep portion, and a third shallow portion whose depth is smaller than the second shallow portion and which is disposed on the second tread edge side of the third deep portion.

It is preferable that the first middle land portion is further provided with non-transverse narrow grooves extending from the crown main groove and not crossing the first middle land portion.

It is preferable that the second middle land portion is provided with transverse narrow grooves crossing the second middle land portion, and non-transverse narrow grooves extending from the crown main groove and not crossing the second middle land portion.

It is preferable that the transverse narrow grooves in the second middle land portion include third transverse narrow grooves, and the third transverse narrow grooves each comprise a narrow portion whose width is not more than 1.5 mm, in the cross section of the third transverse narrow groove, and a wide portion whose width is larger than the narrow portion and opened at the ground contact surface of the second middle land portion.

It is preferable that the third transverse narrow grooves each comprises a first groove portion opened to the crown main groove, a second groove portion opened to the second shoulder main groove, and a third groove between the first groove portion and the second groove portion, and each of the first groove portion and the second groove portion comprises the above-said narrow portion and the about-said wide portion opened at the ground contact surface, whereas the third groove portion comprises only the above-said wide portion and does not comprise the about-said narrow portion.

It is preferable that the transverse narrow grooves in the second middle land portion include fourth transverse narrow grooves, and the groove bottom of each of the fourth transverse narrow grooves is raised in a region including an end on the crown main groove side, of the fourth transverse narrow groove.

It is preferable that the first middle land portion is provided with second transverse narrow grooves crossing the first middle land portion, the first transverse narrow grooves each comprise a first deep portion, a second deep portion, and a first shallow portion therebetween whose depth is smaller than the first deep portion and the second deep portion, and the second transverse narrow grooves each comprise a second shallow portion, a third shallow portion, and a third deep portion therebetween whose depth is more than the second shallow portion and the third shallow portion.

It is preferable that the second shallow portion is disposed on the first tread edge side of the third deep portion, and the length in the tire axial direction of the second shallow portion is smaller than the length in the tire axial direction of the third shallow portion.

It is preferable that the length in the tire axial direction of the second shallow portion is smaller than the length in the tire axial direction of the first shallow portion.

It is preferable that the groove depth of the third shallow portion is smaller than the groove depth of the first shallow portion.

It is preferable that the length in the tire axial direction of the third shallow portion is smaller than the length in the tire axial direction of the first shallow portion.

It is preferable that the first transverse narrow grooves each comprise a narrow portion whose width is not more than 1.5 mm, and a wide portion whose width is larger than the narrow portion and opened at the ground contact surface of the first middle land portion.

It is preferable that the second transverse narrow grooves each have a width of not more than 1.5 mm over its entire length and entire depth.

It is preferable that the second middle land portion is provided with transverse narrow grooves crossing the second middle land portion, and the transverse narrow grooves in the second middle land portion each comprise a fourth shallow portion, a fifth shallow portion, and a fourth deep portion therebetween whose depth is greater than the fourth shallow portion and the fifth shallow portion.

It is preferable that the fifth shallow portion is disposed on the second tread edge side of the fourth deep portion, and the depth of the fifth shallow portion is more than the depth of the fourth shallow portion.

It is preferable that the four land portions include a first shoulder land portion between the first tread edge and the first shoulder main groove, and a second shoulder land portion between the second tread edge and the second shoulder main groove, and the second shoulder land portion is provided with a plurality of shoulder narrow grooves.

It is preferable that the width in the tire axial direction of the ground contact surface of the second shoulder land portion is the smallest among the four land portions.

It is preferable that the width in the tire axial direction of the ground contact surface of the second shoulder land portion is not less than 0.10 times the tread width.

It is preferable that the width in the tire axial direction of the ground contact surface of the first shoulder land portion is the largest among the four land portions.

Therefore, in the tire according to the present invention, as the first middle land portion is disposed on the tire equator, excessive deformation of the tread portion is suppressed, and excellent steering stability is exhibited. Further, as the first middle land portion is crossed by the transverse narrow grooves, the rigidity of the first middle land portion is moderately reduced, and excellent ride comfort is obtained.

Furthermore, as the transverse narrow grooves include the first transverse narrow grooves each comprising the first and second deep portions and the first shallow portion therebetween, the ride comfort is enhanced while maintaining the steering stability.

DESCRIPTION OF THE PREFERRED EMBODIMENTS

Figure 1:
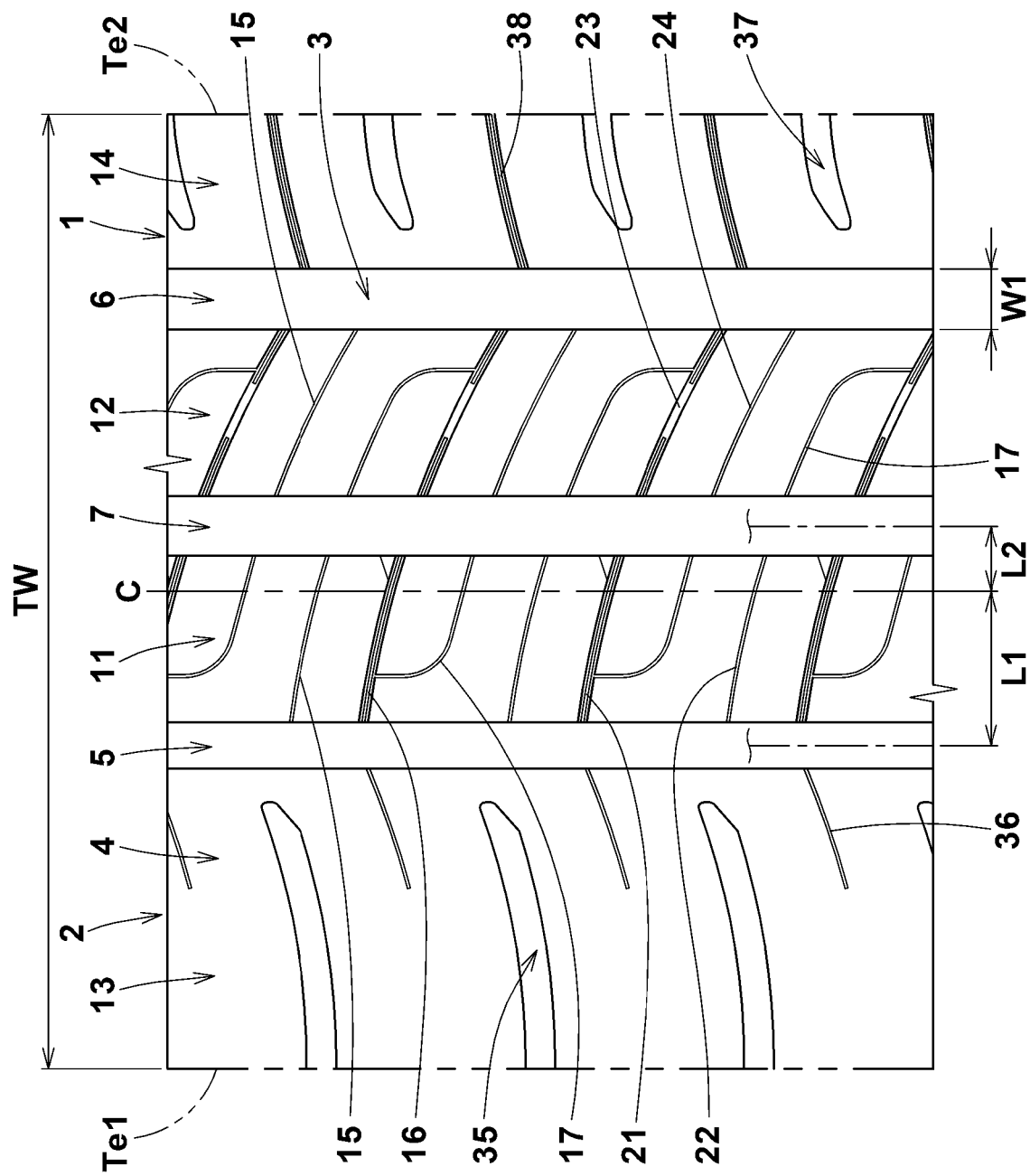
FIG. 1 is a developed view of a tread portion of a tire as an embodiment of the present invention.

Embodiments of the present invention will now be described in detail in conjunction with accompanying drawings. FIG. 1 is a developed view of a tread portion 2 of a tire 1 showing an embodiment of the present invention.

The present invention can be applied to various tires, for example, pneumatic tires as well as non-pneumatic tires such as so-called airless tires, for various vehicles, for example, passenger cars, heavy-duty vehicles such as truck/bus and the like. However, the present invention is suitably applied to a pneumatic tire for passenger cars.

In the present embodiment, the tire 1 is a pneumatic tire for passenger cars.

In the present invention, as shown in FIG. 1, an intended position of the tire 1 when mounted on a vehicle is specified.

The intended position (namely, which side of the tire is to be positioned outward of the vehicle) is indicated by, for example, characters or symbols on the sidewall portions (not shown) of the tire.

Thus, the tread portion 2 of the tire 1 has a first tread edge Te1 and a second tread edge Te2 to be located outward and inward, respectively, of the vehicle when the tire 1 is mounted on the vehicle.

The first tread edges Te1 and the first tread edges Te2 are the axial outermost edges of the ground contacting patch of the tire which occurs when the camber angle of the tire is zero (under a normally inflated loaded condition of the tire in the case of a pneumatic tire).

The tread width Tw is the axial distance between the tread edges Te1 and Te2 (measured under a normally inflated unloaded condition of the tire in the case of a pneumatic tire).

The normally inflated unloaded condition is such that the tire is mounted on a standard wheel rim and inflate to a standard pressure but loaded with no tire load.

The normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load capacity" in ETRTO, the maximum value given in the above-mentioned table in TRA or the like.

In this application including specification and claims, various dimensions, positions and the like of the pneumatic tire refer to those under the normally inflated unloaded condition of the tire unless otherwise noted.

The tread portion 2 is provided, between the first tread edge Te1 and the second tread edge Te2, with three main grooves 3 continuously extending in the tire circumferential direction to axially divide the tread portion 2 into four land portions 4.

The main grooves 3 are
a first shoulder main groove 5 disposed between the first tread edge Te1 and the tire equator C,
a second shoulder main groove 6 disposed between the second tread edge Te2 and the tire equator c, and
a crown main groove 7 disposed between the first shoulder main groove 5 and the second shoulder main groove 6.

It is preferable that the distance L1 in the tire axial direction from the tire equator c to the groove center line of the first shoulder main groove 5, and the distance L1 in the tire axial direction from the tire equator c to the groove center line of the second shoulder main groove 6 are set in a range from 0.15 to 0.35 times the tread width Tw.

The crown main groove 7 in the present embodiment is disposed on the second tread edge (Te2) side of the tire equator c. Preferably, the distance L2 in the tire axial direction from the tire equator c to the groove center line of the crown main groove 7 is set in a range from 0.05 to 0.10 times the tread width TW.

In the present embodiment, each of the main grooves 3 is a straight groove extending, for example, in parallel with the tire circumferential direction. But, the main grooves 3 may be extended in a wave form, for example.

Preferably, the groove width W of each of the main grooves 3 is set in a range from 4.0% to 7.0% of the tread width Tw. In the case of a pneumatic tire for passenger cars, it is preferable that the depths of the main grooves 3 are set in a range from 5 to 10 mm.

The land portions 4 include a first middle land portion 11, a second middle land portion 12, a first shoulder land portion 13, and a second shoulder land portion 14.

The first middle land portion 11 is defined between the first shoulder main groove 5 and the crown main groove 7.

The second middle land portion 12 is defined between the second shoulder main groove 6 and the crown main groove 7.

The first shoulder land portion 13 is defined between the first shoulder main groove 5 and the first tread edge Te1.

The second shoulder land portion 14 is defined between the second shoulder main groove 6 and the second tread edge Te2.

Figure 2:
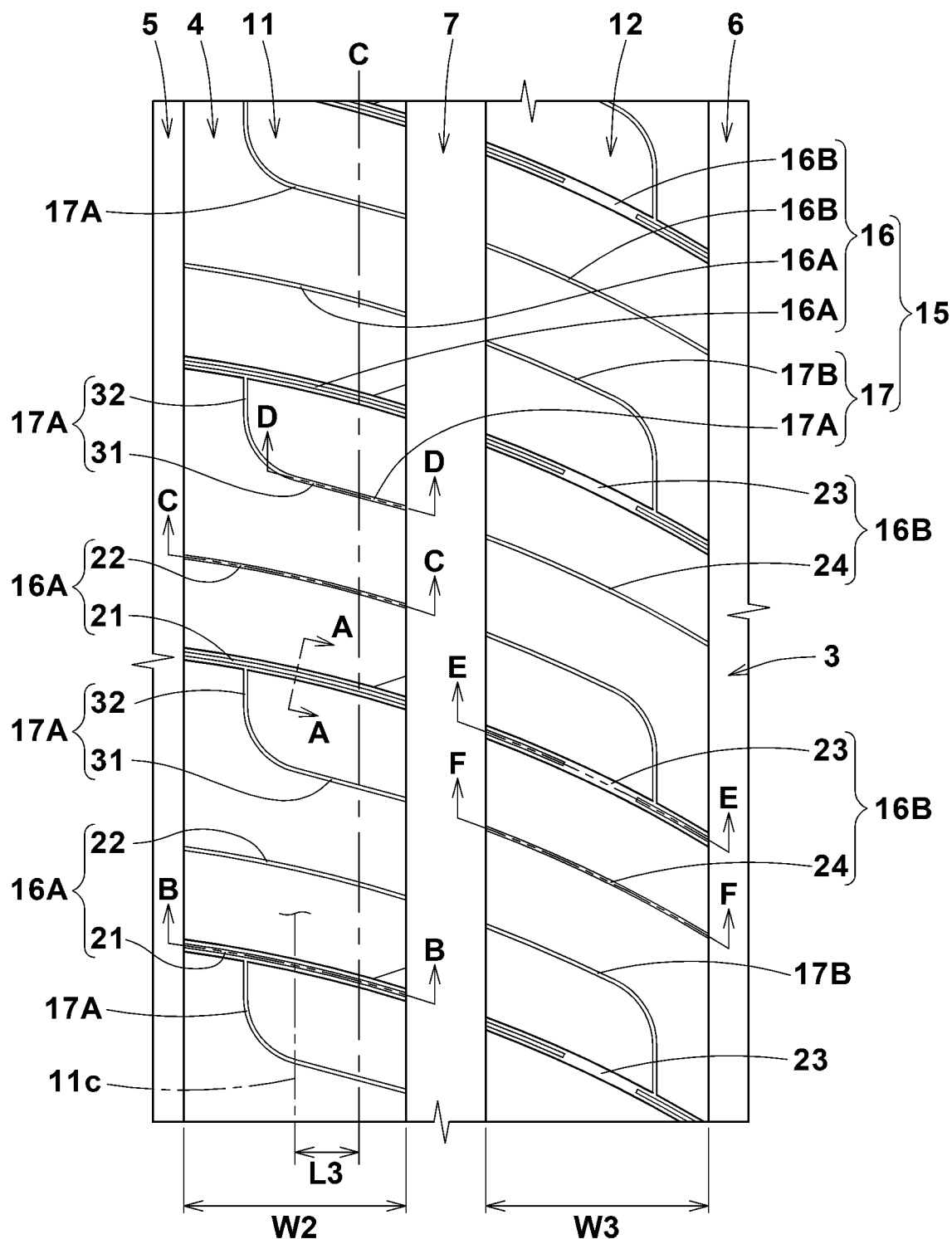
FIG. 2 is an enlarged view of the first middle land portion and the second middle land portion shown in FIG. 1.

FIG. 2 is an enlarged view showing the first middle land portion 11 and the second middle land portion 12.

It is preferable that, as shown in FIG. 2, the width W2 in the tire axial direction of the first middle land portion 11 and the width W3 in the tire axial direction of the second middle land portion 12 are set in a range from 0.10 to 0.25 times the tread width Tw, for example.

In the present embodiment, the width W2 of the first middle land portion 11 is the substantially same as the width W3 of the second middle land portion 12.

The first middle land portion 11 is disposed such that the ground contact surface thereof includes the tire equator C. Thereby, excessive deformation of the tread portion 2 is suppressed, and excellent steering stability is exhibited.

In the present embodiment, the tire equator C is positioned on the second tread edge (Te2) side of the center line 11c in the tire axial direction of the first middle land portion 11. Preferably, the distance L3 in the tire axial direction between the tire equator C and the center line 11c is set in a range from 0.20 to 0.40 times the width W2 of the first middle land portion.

Each of the first middle land portion 11 and the second middle land portion 12 is provided with a plurality of narrow grooves 15.

In the present embodiment, the narrow grooves 15 include a plurality of transverse narrow grooves 16 crossing the land portion 4, and a plurality of non-transverse narrow grooves 17 extending from the crown main groove 7 and not crossing the land portion 4.

The transverse narrow grooves 16 include transverse narrow grooves 16A disposed in the first middle land portion 11, and transverse narrow grooves 16B disposed in the second middle land portion 12.

The non-transverse narrow grooves 17 include non-transverse narrow grooves 17A disposed in the first middle land portion 11, and non-transverse narrow grooves 17B disposed in the second middle land portion 12.

In the tire according to the present invention, as described above, the first middle land portion 11 is provided with the plurality of transverse narrow grooves 16A crossing the first middle land portion 11.

Thereby, the rigidity of the first middle land portion 11 is moderately reduced, and excellent ride comfort is obtained.

Here, the narrow groove means a groove having a groove width of 3.0 mm or less at the ground contact surface of the land portion, and includes a so-called sipe.

The transverse narrow grooves 16A disposed in the first middle land portion 11 are inclined with respect to the tire axial direction to a first direction (in FIG. 2, inclined to the lower right).

The angle of the transverse narrow grooves 16A with respect to the tire axial direction is 5 to 10 degrees, for example.

Further, it is preferable that the transverse narrow grooves 16A in the present embodiment are slightly curved such that the angle with respect to the tire axial direction gradually increases toward the second tread edge Te2.

The transverse narrow grooves 16A disposed in the first middle land portion 11 include a first transverse narrow groove 21 and a second transverse narrow groove 22 in this example. The first transverse narrow grooves 21 and the second transverse narrow grooves 22 are arranged alternately in the tire circumferential direction.

Figure 3:
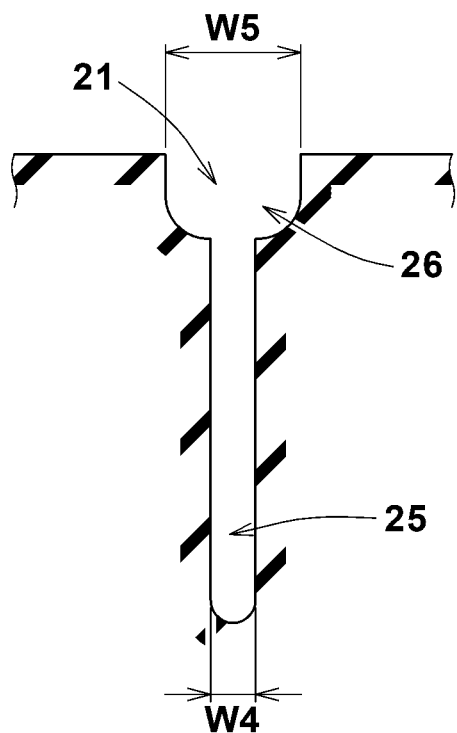
FIG. 3 is a cross-sectional view taken along line A-A of FIG. 2.

FIG. 3 is a cross-sectional view of the first transverse narrow groove 21 taken along line A-A of FIG. 2. As shown in FIG. 3, the first transverse narrow groove 21 comprises a narrow portion 25 having a width W4 of not more than 1.5 mm, and a radially outer wide portion 26 having a width greater than that of the narrow portion 25 and extending radially outwardly from the narrow portion 25 to open at the ground contact surface of the land portion.

Preferably, the width W5 of the wide portion 26 at the ground contact surface is set in a range from 1.8 to 2.5 mm in this example.

The radial dimension of the wide portion 26 is set in a range from 1.0 to 2.0 mm, for example.

Such first transverse narrow grooves 21 make it easier for the ground contact surface to follow convexoconcave of the road surfaces, and improves the initial response to steering.

Figure 4:
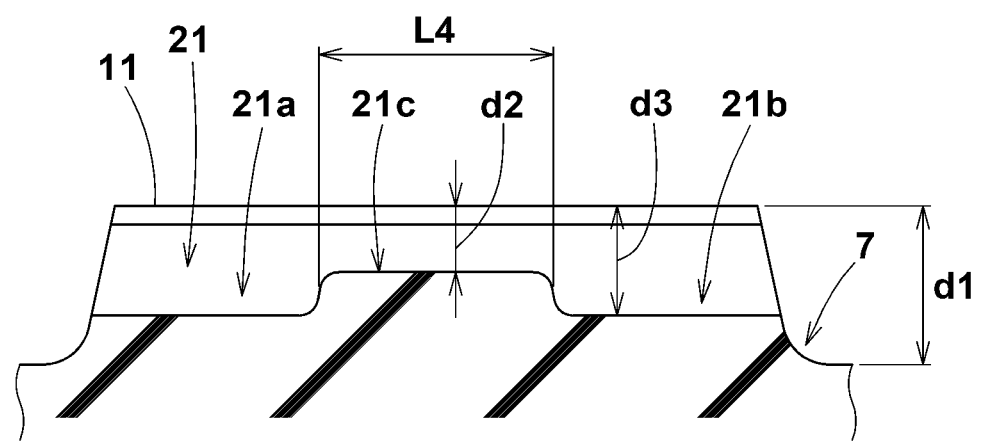
FIG. 4 is a cross-sectional view taken along line B-B of FIG. 2.

FIG. 4 is a cross-sectional view of the first transverse narrow groove 21 taken along line B-B of FIG. 2.

As shown, in this example, the first transverse narrow groove 21 comprises a first deep portion 21a, a second deep portion 21b, and a first shallow portion 21c therebetween whose depth is smaller than those of the first deep portion 21a and the second deep portion 21b. Thus, the first transverse narrow groove 21 is deeper in its both end portions than in the central portion. Such first transverse narrow grooves 21 are useful for improving ride comfort while maintaining steering stability.

The maximum depth d3 of the transverse narrow groove 16 is, for example, 0.60 to 1.00 times, more preferably 0.65 to 0.75 times the depth d1 of the crown main groove 7.

In the present embodiment, the maximum depth d3 corresponds to the depth of the first deep portion 21a or the second deep portion 21b of the first transverse narrow groove 21. Preferably, the depth d2 of the first shallow portion 21c is set in a range from 0.30 to 0.50 times the depth d1 of the crown main groove 7, for example.

The length L4 in the tire axial direction of the first shallow portion 21c is, for example, set in a range from 0.25 to 0.50 times the width W2 (shown in FIG. 2) in the tire axial direction of the first middle land portion 11.

Preferably, the length L4 in the tire axial direction of the first shallow portion 21c is larger than the length in the tire axial direction of the first deep portion 21a and the length in the tire axial direction of the second deep portion 21b.

Such first shallow portions 21c exhibit excellent ride comfort and also improves wear resistance.

The second transverse narrow grooves 22 extend along the first transverse narrow grooves 21, preferably extend parallel with the first transverse narrow groove 21 as shown in FIG. 2.

It is preferable that the second transverse narrow groove 22 has a width of not more than 1.5 mm over its entire length and entire depth, and in the present embodiment, the width is in a range from 0.5 to 1.0 mm over the entire length and entire depth.

Figure 5:
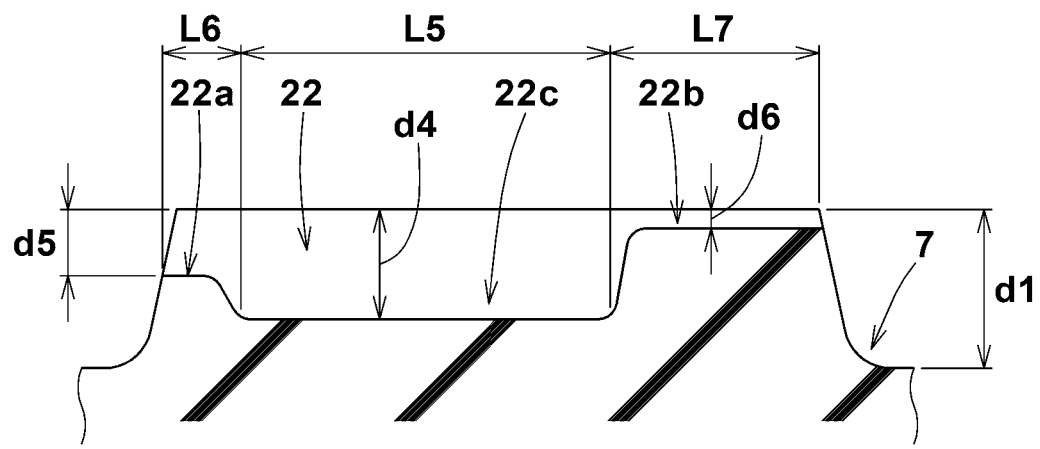
FIG. 5 is a cross-sectional view taken along line C-C of FIG. 2.

FIG. 5 is a cross-sectional view of the second transverse narrow groove 22 taken along the line C-C of FIG. 2. As shown in FIG. 5, the second transverse narrow groove 22 comprises a second shallow portion 22a, a third shallow portion 22b, and a third deep portion 22c therebetween whose depth is greater than those of the second shallow portion 22a and the third shallow portion 22b.

The third deep portion 22c includes, in its axial extent, the center in the tire axial direction of the second transverse narrow groove 22.

In the present embodiment, the second shallow portion 22a is positioned on the first tread edge (Te1) side of the third deep portion 22c. And, the third shallow portion 22b is positioned on the second tread edge (Te2) side of the third deep portion 22c. Such second transverse narrow grooves 22 cooperate with the above-described first transverse narrow grooves 21 to improve steering stability and wear resistance in a well-balanced manner.

The depth d4 of the third deep portion 22c is preferably set in a range from 0.60 to 1.00 times the depth d1 of the crown main groove 7.

In the present embodiment, the depth d4 of the third deep portion 22c is the same as the depth (shown in FIG. 4) of the first deep portion 21a and the second deep portion 21b.

The depth d5 of the second shallow portion 22a is, for example, set in a range from 0.15 to 0.50 times the depth d1 of the crown main groove 7. Preferably, the depth d5 of the second shallow portion 22a is set in a range from 0.40 to 0.85 times the depth d4 of the third deep portion 22c.

It is preferable that the depth d6 of the third shallow portion 22b is smaller than the depth of the second shallow portion 22a. In the present embodiment, the depth d6 of the third shallow portion 22b is the same as the depth (or radial dimension) of the radially outer wide portion 26 (shown in FIG. 3) of the first transverse narrow groove 21.

such second transverse narrow grooves 22 can maintain the rigidity of the first middle land portion 11 in its tire equator (c) side, and improves steering stability and wear resistance.

The length in the tire axial direction L5 of the third deep portion 22c is, for example, set in a range from 0.45 to 0.65 times the width W2 in the tire axial direction of the first middle land portion 11. In the present embodiment, it is preferable that the length L5 in the tire axial direction of the third deep portion 22c is more than the length L4 (shown in FIG. 4) in the tire axial direction of the first shallow portion 21c of the first transverse narrow groove 21.

The length L6 in the tire axial direction of the second shallow portion 22a is smaller than
the length L5 in the tire axial direction of the third deep portion 22c,
the length L7 in the tire axial direction of the third shallow portion 22b, and
the length L4 in the tire axial direction of the first shallow portion 21c of the first transverse narrow groove 21.
Specifically, the length L6 of the second shallow portion 22a is 0.05 to 0.20 times the width W2 in the tire axial direction of the first middle land portion 11.

Such second shallow portion 22a makes it easier for the second transverse narrow groove 22 to open in its second tread edge (Te1) side, and wet performance can be improved.

For example, the length L7 in the tire axial direction of the third shallow portion 22b is smaller than the length L5 in the tire axial direction of the third deep portion 22c, and preferably smaller than the length L4 in the tire axial direction of the first shallow portion 21c.

The length L7 of the third shallow portion 22b is, for example, set in a range from 0.30 to 0.40 times the width W2 of the first middle land portion 11.

It is preferable that each of the non-transverse narrow grooves 17 is connected to one of the transverse narrow grooves 16 adjacent in the tire circumferential direction to the concerned non-transverse narrow groove 17 as shown in FIG. 2. Each of the non-transverse narrow grooves 17A provided in the first middle land portion 11 is connected to the first transverse narrow groove 21 adjacent thereto in a first tire circumferential direction (in FIG. 2, connected to an upward first transverse narrow groove 21).

In the first middle land portion 11, the non-transverse narrow grooves 17A are respectively disposed between the first transverse narrow grooves 21 and the second transverse narrow grooves 22.

It is preferable that the non-transverse narrow groove 17 has a width of not more than 1.5 mm over its entire length and entire depth. In the present embodiment, the width is in a range from 0.5 to 1.0 mm over the entire length and entire depth.

The non-transverse narrow groove 17 comprises
a first portion 31 inclined with respect to the tire axial direction to the first direction, and
a second portion 32 bent and extending from the first portion 31 and extending to the transverse narrow groove 16.
The first portion 31 extends, for example, along the transverse narrow grooves 16. Preferably, the first portion 31 extends parallel with the transverse narrow grooves 16.
The second portion 32 is bent in an arc shape from the first portion 31 and extending to the transverse narrow groove 16.
The non-transverse narrow groove 17 crosses the center line 11c in the tire axial direction of the first middle land portion 11, and
the second portion 32 is positioned on the first tread edge (Te1) side of the center line 11c, and connected to the first transverse narrow groove 21.
Such non-transverse narrow grooves 17 improve wet performance while maintaining steering stability and wear resistance.
The non-transverse narrow groove 17 is however, not limited to such configuration.

Figure 6:
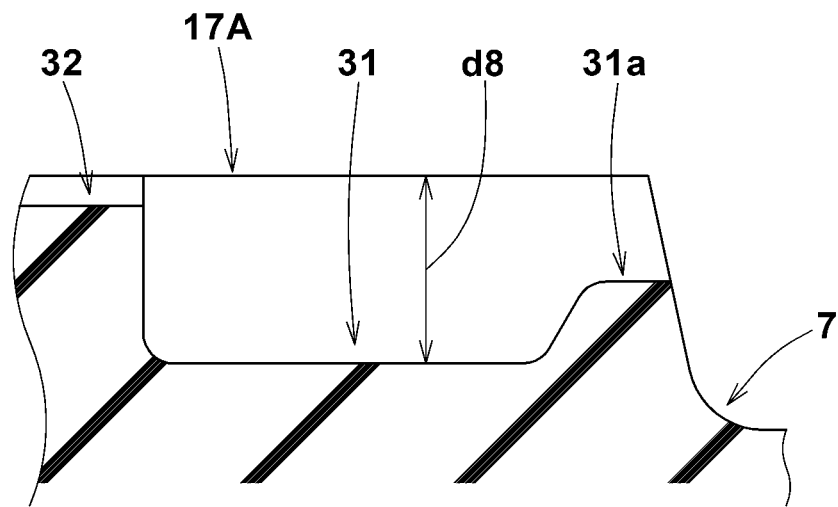
FIG. 6 is a cross-sectional view taken along line D-D of FIG. 2.

FIG. 6 is a sectional view of the first portion 31 taken along line D-D of FIG. 2. As shown in FIG. 6, the maximum depth d8 of the non-transverse narrow groove 17 is set in a range from 0.40 to 1.50 times, preferably, 0.90 to 1.10 times the maximum depth d3 (shown in FIG. 4) of the transverse narrow groove 16. In the present embodiment, the maximum depth d8 corresponds to the maximum depth of the first portion 31.
Preferably, the first portion 31 is provided with a shallow portion 31a where the groove bottom is raised in its end portion on the crown main groove (7) side.
The shallow portion 31a of the first portion 31 in this example has the substantially same shape as the second shallow portion 22a (shown in FIG. 5) of the second transverse narrow groove 22. And the configuration of the second shallow portion 22a described above can be applied to the shallow portion 31a of the first portion 31.

The maximum depth of the second portion 32 is smaller than the maximum depth of the first portion 31, for example. It is preferable that the maximum depth of the second portion 32 is smaller than the depth of the shallow portion 31a of the first portion 31.
In the present embodiment, the depth of the second portion 32 is the same as the depth of the radially outer wide portion 26 (shown in FIG. 3) of the first transverse narrow groove 21.

As shown in FIG. 2, the transverse narrow grooves 16B and the non-transverse narrow grooves 17B provided in the second middle land portion 12 are inclined with respect to the tire axial direction to the above-said first direction, in this example.
The transverse narrow grooves 16B provided in the second middle land portion 12 are inclined with respect to the tire axial direction at a larger angle than that of the transverse narrow grooves 16A provided in the first middle land portion 11.
The angle of the transverse narrow grooves 16B provided in the second middle land portion 12 with respect to the tire axial direction is set in a range from 20 to 30 degrees, for example. Further, it is preferred that the transverse narrow grooves 16B in the present embodiment are slightly curved so that their angle with respect to the tire axial direction is gradually increased toward the second tread edge Te2.

The transverse narrow grooves 16B provided in the second middle land portion 12 include third transverse narrow grooves 23 and fourth transverse narrow grooves 24.

The third transverse narrow groove 23 has, in at least partially of its length, the same cross-sectional shape as that of the first transverse narrow groove 21 shown in FIG. 3, comprising a narrow portion 25 having a width of not more than 1.5 mm, and a radially outer wide portion 26 having a width greater than that of the narrow portion 25 and extending radially outwardly from the narrow portion 25 to open at the ground contact surface of the land portion.
Similarly to the above-said second transverse narrow groove 22, the fourth transverse narrow groove 24 preferably has a width of not more than 1.5 mm over its entire length and entire depth. In the present embodiment, the width is in a range from 0.5 to 1.0 mm over the entire length and entire depth.

Figure 7:
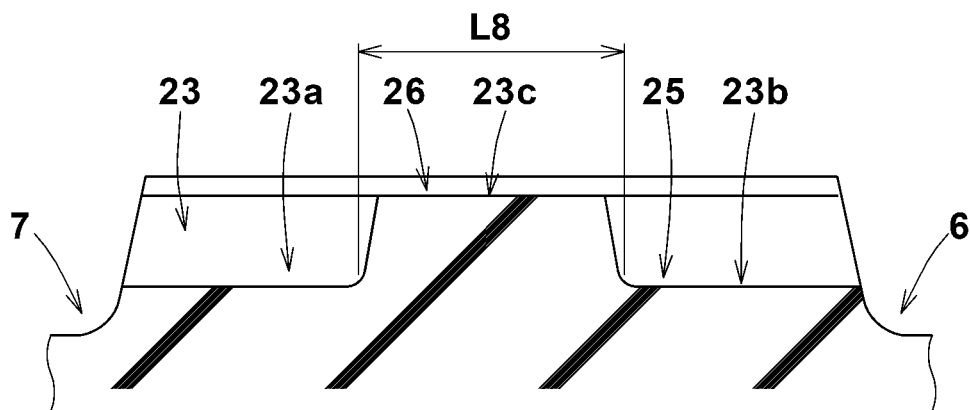
FIG. 7 is a cross-sectional view taken along line E-E of FIG. 2.

FIG. 7 is a sectional view of the third transverse narrow groove 23 taken along line E-E in FIG. 7.
As shown in FIG. 7, in this example, the third transverse narrow groove 23 comprises
a first groove portion 23a opened to the crown main groove 7,
a second groove portion 23b opened to the second shoulder main groove 6, and
a third groove portion 23c between the first groove portion 23a and the second groove portion 23b.
The first groove portion 23a and the second groove portion 23b each have the structure of the narrow portion 25 and the radially outer wide portion 26 as explained above.
The groove depth of the third groove portion 23c is smaller than those of the first groove portion 23a and the second groove portion 23b. In the present embodiment, the third groove portion 23c is formed by only the wide portion 26. Such third transverse narrow grooves 23 help maintain the rigidity of the second middle land portion 12 and exhibit excellent steering stability and wear resistance.
The third groove portion 23c in this example crosses the center in the tire axial direction of the second middle land portion 12.
It is preferable that the length L8 in the tire axial direction of the third groove portion 23c is set in a range from 0.35 to 0.50 times the width W3 (shown in FIG. 2) in the tire axial direction of the second middle land portion 12.

Figure 8:
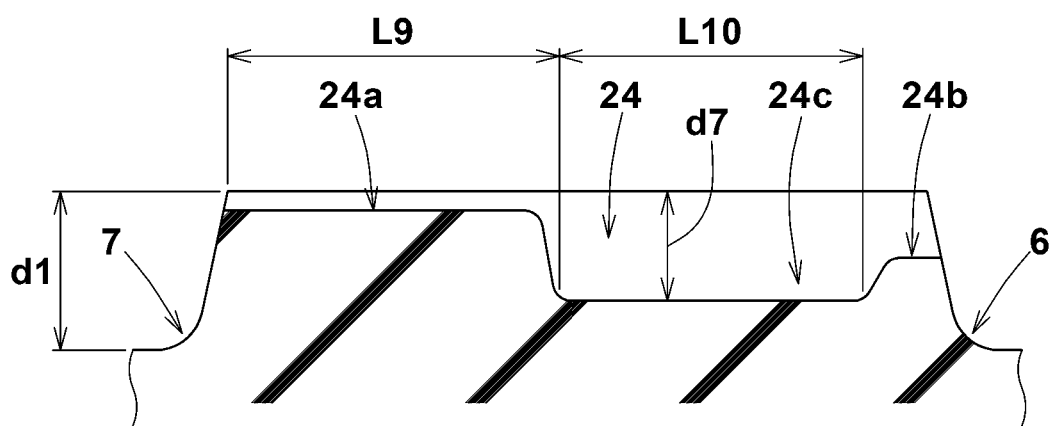
FIG. 8 is a cross-sectional view taken along line F-F of FIG. 2.

FIG. 8 is a sectional view of the fourth transverse narrow groove 24 taken along line F-F in FIG. 2.
As shown in FIG. 8, the bottom surface of the fourth transverse narrow groove 24 is raised at least in a region including its end on the crown main groove (7) side.
In the present embodiment, the fourth transverse narrow groove 24 comprises a fourth shallow portion 24a, a fifth shallow portion 24b, and a fourth deep portion 24c therebetween whose depth is greater than those of the fourth shallow portion 24a and the fifth shallow portion 24b.
The fourth shallow portion 24a is positioned on the first tread edge (Te1) side of the fourth deep portion 24c, and the fifth shallow portion 24b is positioned on the second tread edge (Te2) side of the fourth deep portion 24c.
In the present embodiment, the depth of the fourth shallow portion 24a is the same as the depth of the radially outer wide portion 26 described above.
Preferably, the length L9 in the tire axial direction of the fourth shallow portion 24a is larger than the length L8 in the tire axial direction (shown in FIG. 7) of the third groove 23c of the third transverse narrow groove 23.

The length L9 of the fourth shallow portion 24a is set in a range from 0.40 to 0.55 times the width W3 in the tire axial direction of the second middle land portion 12.

Such fourth shallow portion 24a helps to maintain the rigidity of the second middle land portion 12 in its the tire equator (c) side.

It is preferable that the depth of the fifth shallow portion 24b is larger than the depth of the fourth shallow portion 24a, for example.

The fifth shallow portion 24b in this example has the substantially same shape as the second shallow portion 22a of the second transverse narrow groove 22 shown in FIG. 5, so the above-described configuration of the second shallow portion 22a can be applied thereto.

The depth d7 of the fourth deep portion 24c is, for example, set in a range from 0.60 to 1.00 times the depth d1 of the crown main groove 7.

The fourth deep portion 24c in this example crosses the center in the tire axial direction of the second middle land portion 12.

The length L10 in the tire axial direction of the fourth deep portion 24c is larger than, for example, the length in the tire axial direction of the first groove portion 23a or the second groove portion 23b (shown in FIG. 7) of the third transverse narrow groove 23. Specifically, the length L10 of the fourth deep portion 24c is set in a range from 0.30 to 0.50 times the width W3 in the tire axial direction of the second middle land portion 12.

The non-transverse narrow grooves 17B disposed in the second middle land portion 12 are connected to the transverse narrow grooves 16 which are adjacent to the non-transverse narrow grooves 17B in the tire circumferential direction as shown in FIG. 2.

It is preferable that each of the non-transverse narrow grooves 17B in this example is connected to one of the transverse narrow grooves 16 adjacent to the concerned non-transverse narrow groove 17B in a second tire circumferential direction opposite to the above-said first tire circumferential direction (in FIG. 2, adjacent thereto on the lower side).

The non-transverse narrow grooves 17B in the present embodiment are connected to the respective third transverse narrow grooves 23. Such arrangement is useful for suppressing uneven wear of the respective land portions.

Except for the above-described configuration, the non-transverse narrow grooves 17B provided in the second middle land portion 12 have the substantially same configuration as that of the non-transverse narrow grooves 17A provided in the first middle land portion 11. Therefore, the configuration of the non-transverse narrow groove 17A described above can be applied to the non-transverse narrow groove 17B provided in the second middle land portion 12.

The non-transverse narrow grooves 17A disposed in the first middle land portion 11 are smoothly continuous with the transverse narrow grooves 16B disposed in the second middle land portion 12 through the crown main groove 7. Further, the non-transverse narrow grooves 17B disposed in the second middle land portion 12 are smoothly continuous with the transverse narrow grooves 16A disposed in the first middle land portion 11 through the crown main groove 7. Such arrangement of the narrow grooves serves to improve wet performance and ride comfort.

Here, the meaning of such an expression "two narrow grooves 15 are smoothly continuous with each other through the crown main groove 7" is defined as follows:

the distance in the tire circumferential direction measured between a first virtual groove portion and a second virtual groove portion within the width of the crown main groove 7, is at most 2 mm, wherein the first virtual groove portion is extended from one of the two narrow grooves in its length direction, keeping the groove inclination at the groove end opened to the crown main groove 7, and the second virtual groove portion is extended from the other of the two narrow grooves in its length direction, keeping the groove inclination at the groove end opened to the crown main groove 7.

More preferable is that the first virtual groove portion and the second virtual groove portion overlap with each other within the width of the crown main groove 7.

More specifically, it is preferable that the non-transverse narrow grooves 17A provided in the first middle land portion 11 are smoothly continuous with the respective fourth transverse narrow grooves 24 through the crown main groove 7. And it is preferable that the non-transverse narrow grooves 17B provided in the second middle land portion 12 are smoothly continuous with the respective second transverse narrow grooves 22 through the crown main groove 7. More preferably, the first transverse narrow grooves 21 are smoothly continuous with the respective third transverse narrow grooves 23 through the crown main groove 7 in the present embodiment.

In the first middle land portion 11, the total number N1 of the transverse narrow grooves 16A is larger than the total number N2 of the non-transverse narrow grooves 17A. Also in the second middle land portion 12, the total number N1 of the transverse narrow grooves 16B is larger than the total number N2 of the non-transverse narrow grooves 17B. The total number N1 is, for example, set in a range from 1.5 to 2.5 times the total number N2.

Such arrangement of the narrow grooves can secure the wet performance while exhibiting the above-described effects.

In the first middle land portion 11 and the second middle land portion 12 in the present embodiment, only the above-said narrow grooves 15 having the groove widths of not more than 3.0 mm are provided, and a groove having a groove width more than 3.0 mm is not provided. With such groove arrangement, excellent steering stability and wear resistance can be obtained.

Figure 9:
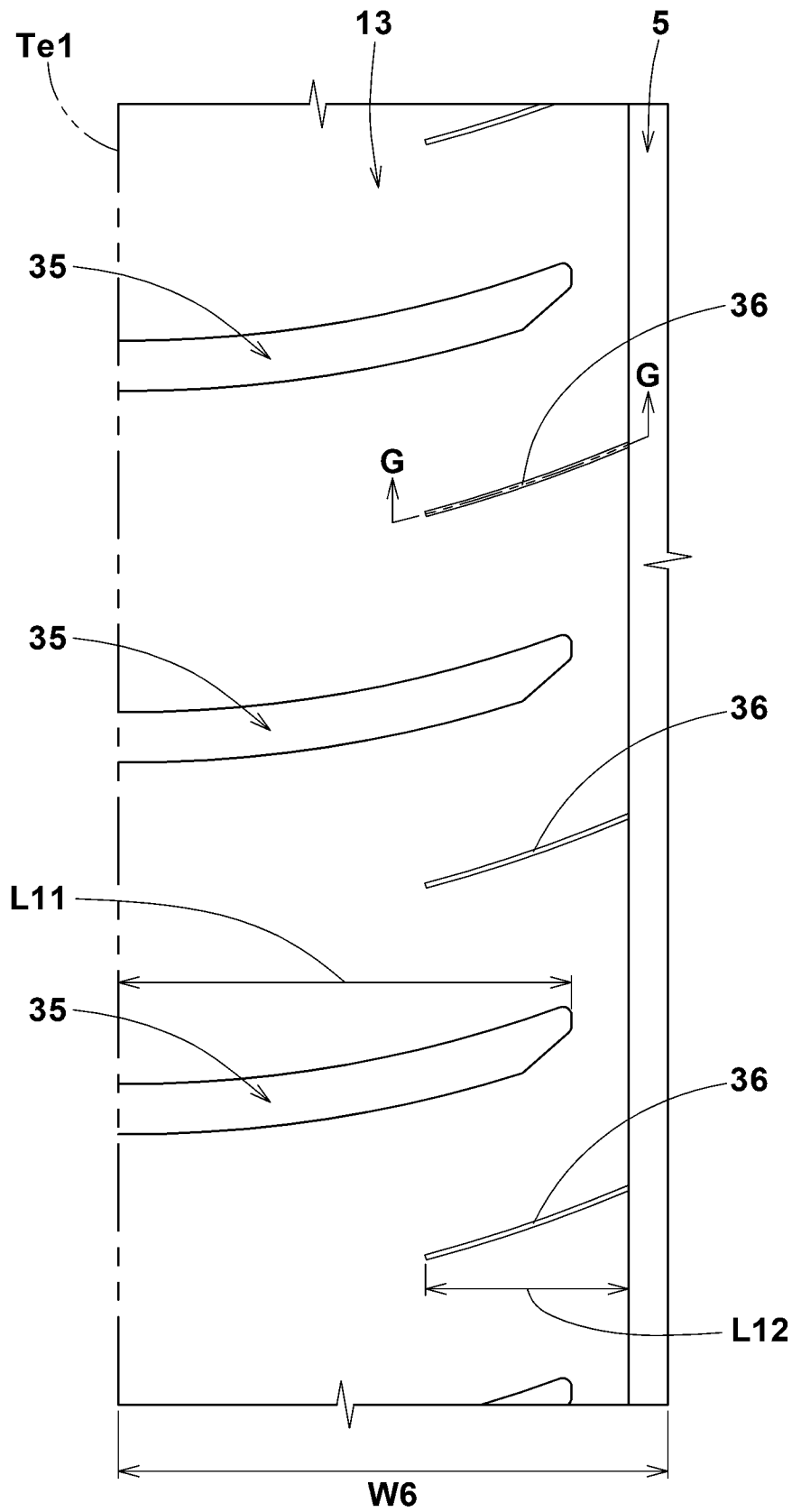
FIG. 9 is an enlarged view of the first shoulder land portion shown in FIG. 1.

FIG. 9 is an enlarged view of the first shoulder land portion 13. As shown in FIG. 9, the width in the tire axial direction of the ground contact surface of the first shoulder land portion 13 is the largest among the four land portions. It is preferable that the width W6 in the tire axial direction of the first shoulder land portion 13 is set in a range from 0.25 to 0.35 times the tread width TW.

Such first shoulder land portion 13 can make steering response during cornering linear and can thereby enhance steering stability.

The first shoulder land portion 13 is provided with a plurality of first shoulder lateral grooves 35 whose groove width at the ground contact surface is more than 3.0 mm, and a plurality of first shoulder narrow grooves 36 whose groove width at the ground contact surface is not more than 3.0 mm.

The first shoulder lateral grooves 35 in this example extend from the first tread edge Te1 and terminate within the first shoulder land portion 13.

The first shoulder lateral grooves 35 in this example cross the center in the tire axial direction of the first shoulder land portion 13.

The length L11 in the tire axial direction of the first shoulder lateral grooves 35 is, for example, set in a range from 0.75 to 0.90 times the width W6 in the tire axial direction of the first shoulder land portion 13.

Such first shoulder lateral grooves 35 help to improve steering stability and ride comfort in a well-balanced manner.

It is preferable that the first shoulder narrow groove 36 has a width of not more than 1.5 mm over its entire length and entire depth. In the present embodiment, the width is in a range from 0.5 to 1.0 mm over the entire length and entire depth. The first shoulder narrow grooves 36 in this example extend from the first shoulder main groove 5 and terminate within the first shoulder land portion 13.

The first shoulder narrow grooves 36 in this example terminate at an axial position on the first shoulder main groove (5) side than the center in the tire axial direction of the first shoulder land portion 13.

Further, the first shoulder narrow grooves 36 terminate at an axial position on the first tread edge (Te1) side than the axially inner ends of the first shoulder lateral grooves 35. The length L12 in the tire axial direction of the first shoulder narrow groove 36 is, for example, in a range from 0.35 to 0.45 times the width W6 in the tire axial direction of the first shoulder land portion 13.

Figure 10:
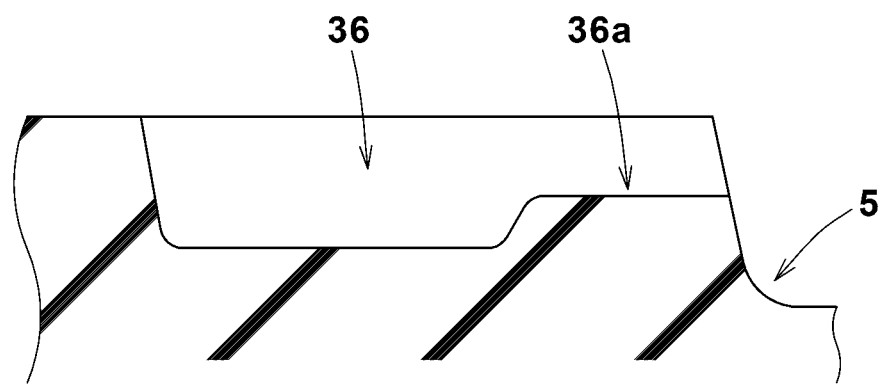
FIG. 10 is a cross-sectional view taken along line G-G of FIG. 9.

FIG. 10 is a sectional view of the first shoulder narrow groove 36 taken along the line G-G of FIG. 9.

Preferably, the first shoulder narrow groove 36 is provided with a shallow portion 36a where the groove bottom is raised in a region including its inner end in the tire axial direction as shown in FIG. 10.

Such first shoulder narrow groove 36 is not excessively opened at the time of contacting with the ground, so steering stability and wear resistance are improved.

It is preferable that the first shoulder lateral grooves 35 and the first shoulder narrow grooves 36 are inclined with respect to the tire axial direction to the above-said second direction opposite to the first direction as shown in FIGS. 1 and 9.

It is preferable that the angles with respect to the tire axial direction of the first shoulder lateral grooves 35 and the first shoulder narrow grooves 36 are set in a range from 5 to 20 degrees.

Figure 11:
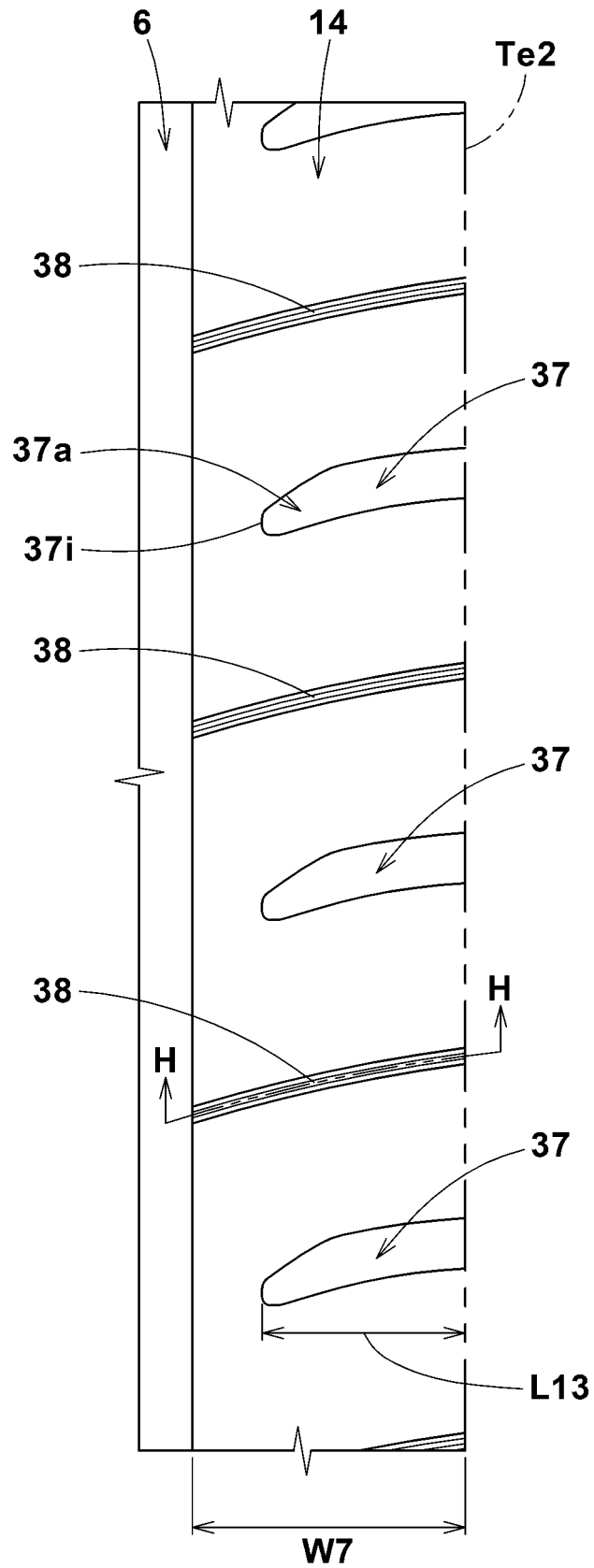
FIG. 11 is an enlarged view of the second shoulder land portion shown in FIG. 1.

FIG. 11 is an enlarged view of the second shoulder land portion 14.

The width in the tire axial direction of the ground contact surface of the second shoulder land portion 14 is the smallest among the four land portions as shown in FIGS. 1 and 11. The width W7 in the tire axial direction of the second shoulder land portion 14 is not less than 0.10 times the tread width Tw, and preferably set in a range from 0.12 to 0.25 times the tread width Tw.

Such second shoulder land portion 14 can further improve the ride comfort.

The second shoulder land portion 14 is provided with a plurality of second shoulder lateral grooves 37 whose groove widths at the ground contact surface are more than 3.0 mm, and a plurality of shoulder narrow grooves 38 whose groove widths at the ground contact surface are not more than 3.0 mm.

The second shoulder lateral grooves 37 in this example extend from the second tread edge Te2 and terminate within the second shoulder land portion 14.

The length L13 in the tire axial direction of the second shoulder lateral grooves 37 in this example is not less than 0.50 times the width W7 in the tire axial direction of the second shoulder land portion 14, and more preferably set in a range from 0.60 to 0.80 times the tread width Tw.

Such second shoulder lateral grooves 37 can improve ride comfort and wet performance while maintaining steering stability.

The second shoulder lateral grooves 37 each comprise a tapered portion 37a whose groove width gradually decreases toward its axially inner end 37i.

The groove depth of the tapered portion 37a is gradually decreased toward the axially inner end 37i.

Such second shoulder lateral grooves 37 can suppress uneven wear around the tapered portion 37a.

The second shoulder narrow groove 38 in this example comprises
a narrow portion 25 whose width is not more than 1.5 mm, and
a radially outer wide portion 26 whose width is larger than the narrow portion 25 and opened at the ground contact surface of the land portion similar to the first transverse narrow groove 21 shown in FIG. 3 which shows the cross-sectional shape thereof. Preferably, the length in the tire axial direction of the second shoulder narrow grooves 38 is larger than the length in the tire axial direction of the second shoulder lateral grooves 37. The second shoulder narrow grooves 38 in this example extend from the second shoulder main groove 6 to the second tread edge Te2.

Figure 12:
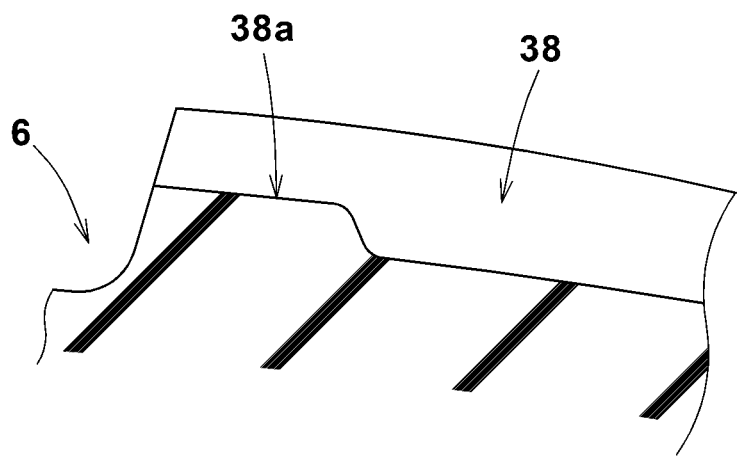
FIG. 12 is a cross-sectional view taken along line H-H of FIG. 11.

FIG. 12 is a sectional view of the second shoulder narrow groove 38 taken along line H-H of FIG. 11.

It is preferable that the second shoulder narrow groove 38 is provided with a shallow portion 38a where the groove bottom is raised in a region including its the axially inner end as shown in FIG. 12.

Such second shoulder narrow grooves 38 are useful for improving steering stability and ride comfort in a well-balanced manner.

It is preferable that the second shoulder lateral grooves 37 and the second shoulder narrow grooves 38 are each inclined with respect to the tire axial direction to the above-said second direction as shown in FIG. 11.

It is preferable that the angle with respect to the tire axial direction of each of the second shoulder lateral grooves 37 and the second shoulder narrow grooves 38 is set in a range from 5 to 20 degrees.

Figure 13:
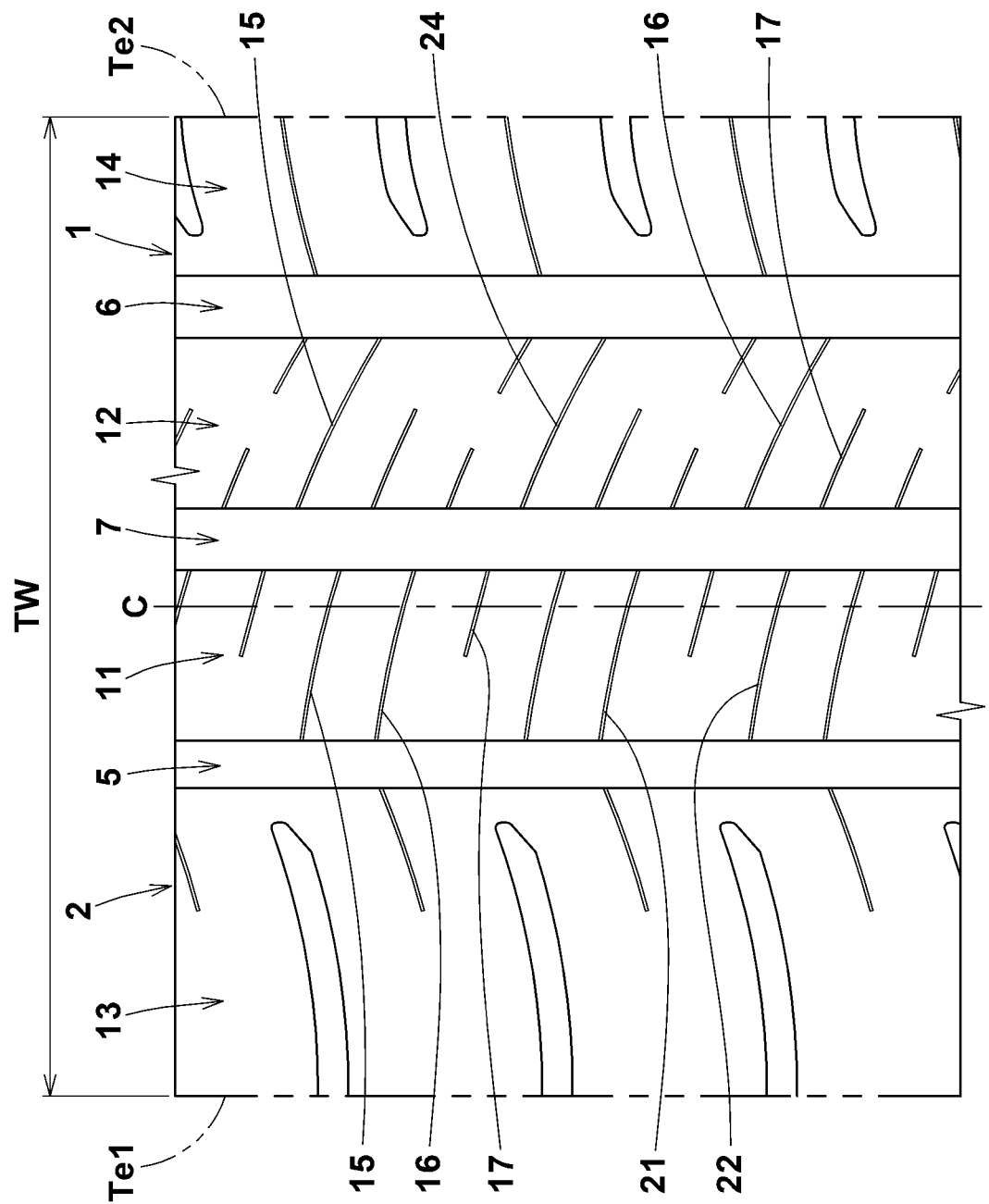
FIG. 13 is a developed view of the tread portion of a tire as another embodiment of the present invention.

FIG. 13 is a developed view of the tread portion 2 of a tire 1 as another embodiment of the present invention. In FIG. 13, elements common to those described above are denoted by the same reference numerals, and description thereof will be omitted.

In this embodiment, the transverse narrow grooves 16 and the non-transverse narrow grooves 17 are modified by removing the portions corresponding to the radially outer wide portions 26 shown in FIG. 3.

Such embodiment can further improve the steering stability as compared to the embodiment shown in FIG. 1.

While detailed description has been made of preferable embodiments of the present invention, the present invention can be embodied in various forms without being limited to the illustrated embodiments.

Comparison Tests

Pneumatic tires of size 235/50R18 were experimentally manufactured as test tires (including working examples Ex. 1-Ex. 9 and reference example Ref. 1). Their specifications are listed in Table 1.

The working examples Ex. 1-Ex. 9 had tread patterns based on the tread pattern shown in FIG. 1.

Figure 14:
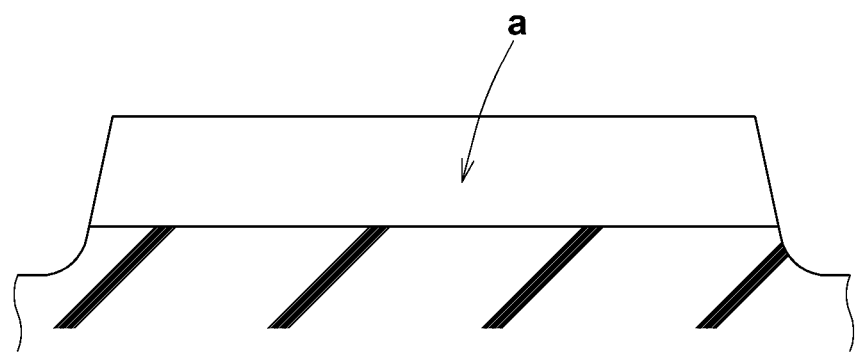
FIG. 14 is a cross-sectional view of the transverse narrow groove of comparative Example 1.

The reference example Ref. 1 had the tread pattern shown in FIG. 1, wherein transverse narrow grooves (a) each had the cross section shown in FIG. 14, that is, the groove bottom thereof was flat. Except for this feature, the reference example Ref. 1 had the same structure as that shown in FIG. 1.

The test tires mounted on wheel rims of size 18×7.5J and inflated to 240 kPa were attached to all wheels of a test car (a 3000 cc four-wheel drive car).

Using the test car, the tires were tested for steering stability and riding comfort as follows.

<Steering Stability Test>

The steering stability when the test car traveled on a dry road was evaluated sensuously by the test driver.
The results are indicated in Table 1 by a score based on the reference example Ref. 1 being 100, wherein the larger the value, the better the steering stability.

<Ride Comfort Test>

The ride comfort when traveling on a dry road surface with the above test car was evaluated sensuously by the test driver.
The results are indicated in Table 1 by a score based on the ride comfort of the reference example Ref. 1 being 100, wherein the larger the numerical value, the better the ride comfort.

Using the test car, the tires were tested for wear resistance and steering response at the initial stage of cornering as follows.

<Wear Resistance Test>

The wear amount of the first middle land portion after the test vehicle traveled for a certain distance on a dry road was measured.
The results are indicated in Table 2 by an index based on the wear amount of the reference example Ref. 1 being 100, wherein the smaller the value, the better the wear resistance.

<Steering Response at Initial Stage of Cornering>

The steering response at the initial stage of cornering when the test car traveled on a dry road was evaluated sensuously by the test driver.
The results are indicated in Table 2 by a score based on the reference example Ref. 1 being 100, wherein the larger the value, the better the steering response at the initial stage of cornering.

TABLE 1

| Tire | Ref. 1 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| first transverse narrow groove (Fig. No.) | 14 | 4 | 4 | 4 | 4 | 4 | 4 | 4 | 4 | 4 |
| depth d2/depth d1 | — | 0.42 | 0.30 | 0.35 | 0.45 | 0.50 | 0.42 | 0.42 | 0.42 | 0.42 |
| length L4/width W2 | — | 0.35 | 0.35 | 0.35 | 0.35 | 0.35 | 0.25 | 0.30 | 0.40 | 0.50 |
| steering stability | 100 | 105 | 105 | 105 | 104 | 103 | 104 | 105 | 105 | 106 |
| ride comfort | 100 | 103 | 102 | 103 | 103 | 103 | 103 | 103 | 103 | 102 |

From the test results, it was confirmed that the working examples Ex. 1-Ex. 9 exhibited excellent steering stability and ride comfort.

Further comparison tests were conducted as follows.

By changing the specifications as shown in Table 2, pneumatic tires of size 235/50R18 were experimentally manufactured as test tires (including working examples Ex. 10-Ex. 18 and the reference example Ref. 1).

TABLE 2

| Tire | Ref. 1 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| first transverse narrow groove (Fig. No.) | 14 | 4 | 4 | 4 | 4 | 4 | 4 | 4 | 4 | 4 |
| second transverse narrow groove (Fig. No.) | 14 | 5 | 5 | 5 | 5 | 5 | 5 | 5 | 5 | 5 |
| depth d2/depth d1 | — | 0.42 | 0.30 | 0.35 | 0.45 | 0.50 | 0.42 | 0.42 | 0.42 | 0.42 |
| depth d5/depth d1 | — | 0.42 | 0.30 | 0.35 | 0.45 | 0.50 | 0.42 | 0.42 | 0.42 | 0.42 |
| depth d6/depth d1 | — | 0.12 | 0.12 | 0.12 | 0.12 | 0.12 | 0.05 | 0.10 | 0.15 | 0.20 |
| wear resistance | 100 | 93 | 92 | 93 | 93 | 95 | 93 | 93 | 93 | 94 |
| steering response | 100 | 104 | 102 | 103 | 104 | 105 | 103 | 104 | 104 | 104 |

The working examples Ex. 10-Ex. 18 had tread patterns based on the tread pattern shown in FIG. 1.
The reference example Ref. 1 had the tread pattern shown in FIG. 1, wherein transverse narrow grooves (a) each had the cross section shown in FIG. 14, that is, the groove bottom thereof was flat. Except for this feature, the reference example Ref. 1 had the same structure as that shown in FIG. 1.

The test tires mounted on wheel rims of size 18×7.5J and inflated to 240 kPa were attached to all wheels of the test car (3000 cc four-wheel drive car).

From the test results, it was confirmed that the working examples Ex. 10-Ex. 18 exhibited excellent wear resistance and steering response at the initial stage of cornering.

Further comparison tests were conducted as follows.

Pneumatic tires of size 235/50R18 were experimentally manufactured as test tires (including working examples Ex. 19-Ex. 27 and reference example Ref. 2). Their specifications are listed in Table 3.

The working examples Ex. 19-Ex. 27 had tread patterns based on the tread pattern shown in FIG. 1.

Figure 15:
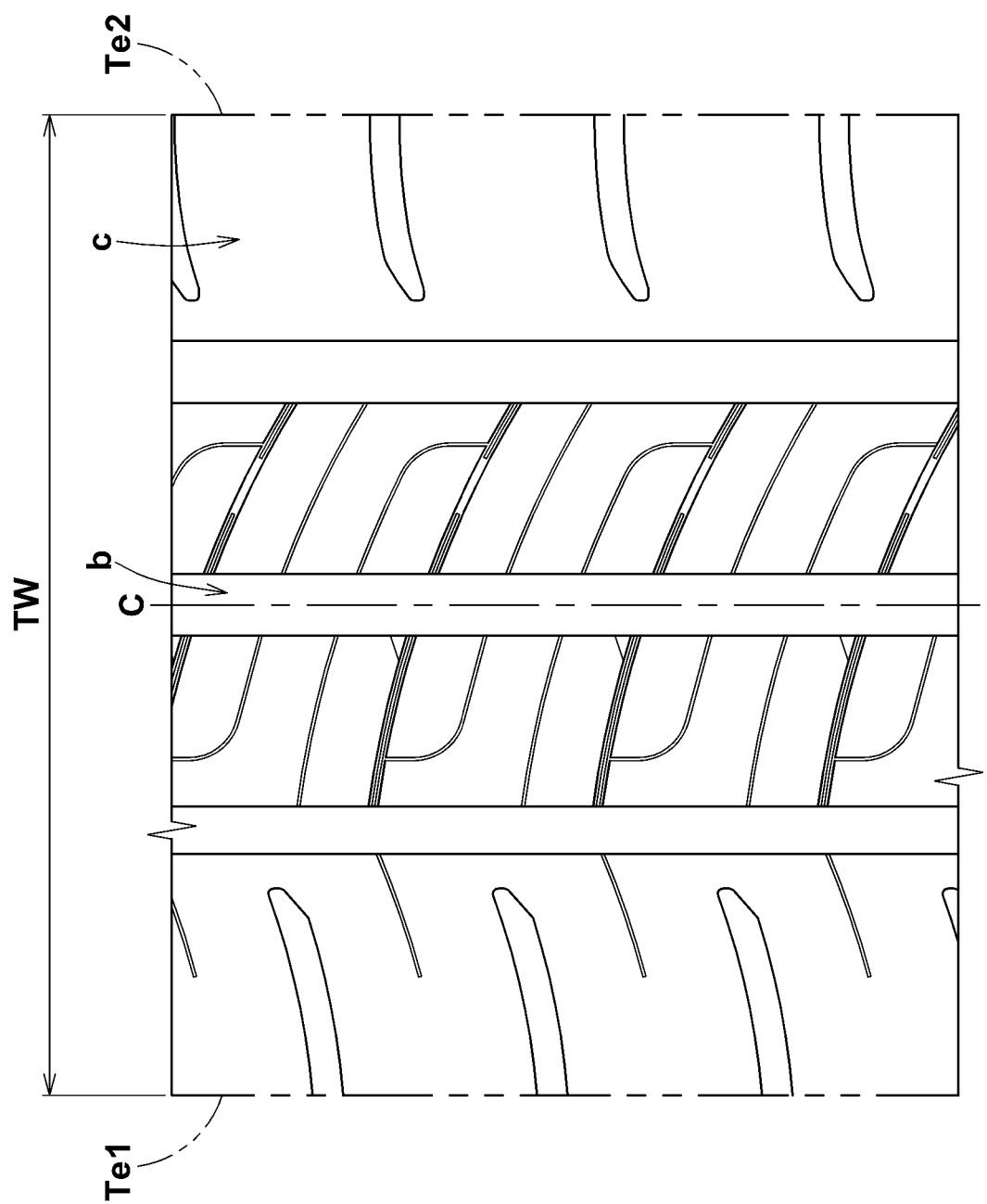
FIG. 15 is a developed view of a tread portion of comparative Example 2.

The reference example Ref. 2 had the tread pattern shown in FIG. 15, wherein the tire equator c was positioned within the width of a crown main groove (b), and a second shoulder land portion (c) was not provided with narrow grooves. Except for these features, the reference example Ref. 2 had the same design as that shown in FIG. 1.

The test tires mounted on wheel rims of size 18×7.5J and inflated to 240 kPa were attached to all wheels of the test car (3000 cc four-wheel drive car).

Using the test car, the tires were tested for wear resistance and ride comfort as follows.

<Wear Resistance Test>

The wear amount of the first middle land portion after the test vehicle traveled for a certain distance on a dry road was measured.
The results are indicated in Table 3 by an index based on the wear amount of the reference example Ref. 2 being 100, wherein the smaller the value, the better the wear resistance.

<Ride Comfort Test>

The ride comfort when traveling on a dry road surface with the above test car was evaluated sensuously by the test driver.
The results are indicated in Table 3 by a score based on the ride comfort of the reference example Ref. 2 being 100, wherein the larger the numerical value, the better the ride comfort.

TABLE 3

| Tire | Ref. 2 | Ex. 19 | Ex. 20 | Ex. 21 | Ex. 22 | Ex. 23 | Ex. 24 | Ex. 25 | Ex. 26 | Ex. 27 |
|---|---|---|---|---|---|---|---|---|---|---|
| tread pattern (Fig. No.) | 15 | 1 | 1 | 1 | 1 | 1 | 1 | 1 | 1 | 1 |
| width W7/ tread width TW | 0.22 | 0.16 | 0.12 | 0.14 | 0.20 | 0.25 | 0.16 | 0.16 | 0.16 | 0.16 |
| length L13/width W7 | 0.82 | 0.75 | 0.75 | 0.75 | 0.75 | 0.75 | 0.50 | 0.60 | 0.80 | 0.90 |
| wear resistance | 100 | 96 | 97 | 96 | 96 | 95 | 95 | 96 | 96 | 98 |
| ride comfort | 100 | 106 | 106 | 106 | 105 | 103 | 103 | 105 | 106 | 106 |

From the test results, it was confirmed that the working examples Ex. 19-Ex. 27 exhibited excellent wear resistance and ride comfort.

REFERENCE SIGNS LIST 2 tread portion
3 main groove
4 land portion
5 first shoulder main groove
6 second shoulder main groove
7 crown main groove
11 first middle land portion
12 second middle land portion
16 transverse narrow grooves
21 first transverse narrow grooves
21a first deep portion
21b second shallow portion
21c first shallow portion
Te1 first tread edge
Te2 second tread edge

The invention claimed is:

1. A tire comprising a tread portion having a first tread edge and a second tread edge to be located outward and inward, respectively, of a vehicle when the tire is mounted on the vehicle, the tread portion being provided with three main grooves extending continuously in the tire circumferential direction to divide the tread portion into four land portions,
wherein
the three main grooves are a first shoulder main groove disposed between the tire equator and the first tread edge, a second shoulder main groove disposed between the tire equator and the second tread edge, and a crown main groove disposed therebetween,
the four land portions include a first middle land portion between the first shoulder main groove and the crown main groove, and a second middle land portion between the second shoulder main groove and the crown main groove,
the first middle land portion is disposed so that the tire equator is positioned in the ground contact surface of the first middle land portion,
the first middle land portion is provided with a plurality of transverse narrow grooves crossing the first middle land portion,
the transverse narrow grooves include first transverse narrow grooves, and second transverse narrow grooves,
the first transverse narrow grooves each comprise
a radially inner narrow portion whose width is not more than 1.5 mm, and
a radially outer wide portion whose width is larger than the narrow portion and opened at the ground contact surface of the first middle land portion,
the second transverse narrow grooves each have a width of not more than 1.5 mm over its entire length and entire depth,
the first transverse narrow grooves each comprise a first deep portion, a second deep portion, and a first shallow portion therebetween whose depth is smaller than the first deep portion and the second deep portion,
the second transverse narrow grooves each comprise
a third deep portion,
a second shallow portion whose depth is smaller than the third deep portion, and
a third shallow portion whose depth is smaller than the second shallow portion,
the third deep portion is disposed so as to include, within its length, a center in the tire axial direction of the second transverse narrow groove,
the second shallow portion is disposed on the first tread edge side of the third deep portion,
the third shallow portion is disposed on the second tread edge side of the third deep portion,
the length (L6) in the tire axial direction of the second shallow portion is smaller than the length (L7) in the tire axial direction of the third shallow portion, and smaller than the length (L4) in the tire axial direction of the first shallow portion,
the length (L7) in the tire axial direction of the third shallow portion is smaller than the length (L4) in the tire axial direction of the first shallow portion, and the groove depth of the third shallow portion is smaller than the groove depth of the first shallow portion.

2. The tire according to claim 1, wherein the width (W2) in the tire axial direction of the first middle land portion is the substantially same as the width (W3) in the tire axial direction of the second middle land portion.

3. The tire according to claim 2, wherein the width (W2) in the tire axial direction of the first middle land portion and the width (W3) in the tire axial direction of the second middle land portion are in a range from 0.10 to 0.25 times the tread width.

4. The tire according to claim 1, wherein
the second middle land portion is provided with transverse narrow grooves crossing the second middle land portion, and
the transverse narrow grooves in the second middle land portion each comprise a fourth shallow portion, a fifth shallow portion, and a fourth deep portion therebetween whose depth is greater than the fourth shallow portion and the fifth shallow portion.

5. The tire according to claim 4, wherein
the fifth shallow portion is disposed on the second tread edge side of the fourth deep portion, and
the depth of the fifth shallow portion is more than the depth of the fourth shallow portion.

6. The tire according to claim 1, wherein
the four land portions include a first shoulder land portion between the first tread edge and the first shoulder main groove, and a second shoulder land portion between the second tread edge and the second shoulder main groove, and
the second shoulder land portion is provided with a plurality of shoulder narrow grooves.

7. The tire according to claim 6, wherein the width in the tire axial direction of the ground contact surface of the first shoulder land portion is the largest among the four land portions.

8. The tire according to claim 6, wherein the width in the tire axial direction of the ground contact surface of the second shoulder land portion is the smallest among the four land portions.

9. The tire according to claim 8, wherein the width in the tire axial direction of the ground contact surface of the second shoulder land portion is not less than 0.10 times the tread width.

10. The tire according to claim 1, wherein the second middle land portion is provided with
transverse narrow grooves crossing the second middle land portion, and
non-transverse narrow grooves extending from the crown main groove and not crossing the second middle land portion.

11. The tire according to claim 10, wherein
the transverse narrow grooves in the second middle land portion include third transverse narrow grooves, and
the third transverse narrow grooves each comprise a radially inner narrow portion whose width is not more than 1.5 mm, in the cross section of the third transverse narrow groove, and a radially outer wide portion whose width is larger than the narrow portion and opened at the ground contact surface of the second middle land portion.

12. The tire according to claim 11, wherein
the third transverse narrow grooves each comprise
a first groove portion opened to the crown main groove, a second groove portion opened to the second shoulder main groove, and
a third groove portion between the first groove portion and the second groove portion, and
each of the first groove portion and the second groove portion comprises said radially inner narrow portion and said radially outer wide portion opened at the ground contact surface, whereas the third groove portion comprises only said radially outer wide portion and does not comprise said radially inner narrow portion.

13. The tire according to claim 10, wherein
the transverse narrow grooves in the second middle land portion include fourth transverse narrow grooves, and
the groove bottom of each of the fourth transverse narrow grooves is raised in a region including an end on the crown main groove side, of the fourth transverse narrow groove.

14. The tire according to claim 13, wherein
each of the fourth transverse narrow grooves comprises a fourth shallow portion, a fifth shallow portion, and a fourth deep portion therebetween whose depth is greater than those of the fourth shallow portion and the fifth shallow portion,
the fourth shallow portion is positioned on the first tread edge side of the fourth deep portion,
the fifth shallow portion is positioned on the second tread edge side of the fourth deep portion,
the depth of the fifth shallow portion is larger than the depth of the fourth shallow portion, and
the length (L9) in the tire axial direction of the fourth shallow portion is in a range from 0.40 to 0.55 times the width W3 in the tire axial direction of the second middle land portion.

15. The tire according to claim 1, wherein the first middle land portion is further provided with non-transverse narrow grooves extending from the crown main groove and not crossing the first middle land portion.

16. The tire according to claim 15, wherein
the non-transverse narrow grooves are respectively disposed between the first transverse narrow grooves and the second transverse narrow grooves, and
each of the non-transverse narrow grooves is connected to one of the first transverse narrow grooves.

17. The tire according to claim 16, wherein each of the non-transverse narrow grooves has a width of not more than 1.5 mm over its entire length and entire depth.

18. The tire according to claim 16, wherein each of the non-transverse narrow grooves comprises
a first portion extending along the transverse narrow grooves and inclined with respect to the tire axial direction, and
a second portion bent in an arc shape and extending from the first portion to said one of the transverse narrow grooves.

19. The tire according to claim 18, wherein the second portion is positioned on the first tread edge side of the center line in the tire axial direction of the first middle land portion.

20. The tire according to claim 19, wherein
the second transverse narrow grooves each consists of the third deep portion, the second shallow portion whose depth is smaller than the third deep portion, and
the third shallow portion whose depth is smaller than the second shallow portion, and
the length (L6) in the tire axial direction of the second shallow portion is smaller than the length (L7) in the tire axial direction of the third shallow portion which is smaller than the length (L5) in the tire axial direction of the third deep portion.

* * * * *